United States Patent
Liu et al.

(10) Patent No.: US 8,901,411 B2
(45) Date of Patent: Dec. 2, 2014

(54) SYSTEM AND METHOD FOR CONTROLLING RAMP RATE OF SOLAR PHOTOVOLTAIC SYSTEM

(75) Inventors: Yan Liu, Ballston Lake, NY (US); Luis Jose Garces, Niskayuna, NY (US); Sumit Bose, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 716 days.

(21) Appl. No.: 12/229,893

(22) Filed: Aug. 27, 2008

(65) Prior Publication Data

US 2010/0057267 A1    Mar. 4, 2010

(51) Int. Cl.
*H02J 3/46* (2006.01)
*H01L 31/042* (2014.01)
*H02J 3/38* (2006.01)
*H02J 3/18* (2006.01)

(52) U.S. Cl.
CPC . *H02J 3/385* (2013.01); *H02J 3/18* (2013.01); Y02E 10/56 (2013.01); Y02E 10/50 (2013.01); Y02E 10/58 (2013.01); Y10S 323/906 (2013.01)
USPC ............... 136/244; 363/60; 363/71; 363/127; 363/131; 323/906; 307/52; 340/635; 700/286; 700/297

(58) Field of Classification Search
CPC ............ H02J 3/18; H02J 3/385; Y02E 10/50; Y02E 10/56; Y02E 41/20
USPC ............... 136/244; 700/297, 286; 363/60, 71, 363/127, 131, 222, 282, 284; 323/906; 307/52
See application file for complete search history.

(56) References Cited

U.S. PATENT DOCUMENTS

| | | | |
|---|---|---|---|
| 5,677,833 A * | 10/1997 | Bingley | 363/71 |
| 5,923,100 A * | 7/1999 | Lukens et al. | 307/66 |
| 6,801,027 B2 | 10/2004 | Hann et al. | 323/282 |
| 7,002,260 B2 | 2/2006 | Stahlkopf | 290/44 |
| 7,148,650 B1 * | 12/2006 | McNulty et al. | 318/801 |
| 7,183,667 B2 | 2/2007 | Colby et al. | 307/19 |
| 7,199,482 B2 | 4/2007 | Hopewell | 290/44 |
| 7,298,059 B2 | 11/2007 | Delmerico et al. | 307/85 |
| 2006/0132993 A1 | 6/2006 | Delmerico et al. | 361/20 |
| 2007/0124025 A1 | 5/2007 | Schram et al. | 700/287 |

(Continued)

FOREIGN PATENT DOCUMENTS

| | | |
|---|---|---|
| EP | 1122856 A2 | 8/2001 |
| EP | 1739824 A2 | 1/2007 |

OTHER PUBLICATIONS

Anca D. Hansen, Poul Sørensen, Frede Blaabjerg, "Power control of a wind farm with active stall wind turbines and AC grid connection" 6pgs.

(Continued)

*Primary Examiner* — Matthew Martin
(74) *Attorney, Agent, or Firm* — Ann M. Agosti (57) ABSTRACT

A photovoltaic (PV) control system generates a power output rate control signal based on a monitored rate of change of collective power output generated via a plurality of PV subsystems and a desired collective output power change rate for the plurality of PV subsystems and communicates the power output rate control signal to the plurality of PV subsystems to control a rate of change of one or more operating parameters of individual PV subsystems in order to control a rate of change of collective output power of the plurality of solar PV subsystems.

23 Claims, 6 Drawing Sheets

(56) References Cited

U.S. PATENT DOCUMENTS

| | | | |
|---|---|---|---|
| 2007/0173982 A1 | 7/2007 | Cardinal et al. | 700/286 |
| 2007/0221267 A1* | 9/2007 | Fornage | 136/244 |
| 2007/0273214 A1 | 11/2007 | Wang et al. | |
| 2008/0099062 A1* | 5/2008 | Armstrong et al. | 136/248 |

OTHER PUBLICATIONS

Reigh Walling, Making Wind Work . . . On the Plant Side,, GE Energy, pp. 1-17, 2006.

Bose, S., et al., "Tieline Controls in Microgrid Applications", Symposium-Bulk Power System Dynamics and Control—VII, Revitalizing Operational Reliability, Aug. 19-24, 2007, pp. 1-9, Charleston, SC, USA.

EP partial Search Report and Written Opinion issued Jun. 6, 2014 in connection with corresponding EP Patent Application No. 09167579.3.

EP complete Search Report and Written Opinion issued Jul. 23, 2014 in connection with corresponding EP Patent Application No. 09167579.3.

* cited by examiner

SYSTEM AND METHOD FOR CONTROLLING RAMP RATE OF SOLAR PHOTOVOLTAIC SYSTEM

BACKGROUND

The invention relates generally to photovoltaic (PV) power generation, and more particularly to techniques for controlling power ramp rates of single or multiple PV systems/inverters associated with single or multiple PV arrays.

Photovoltaic cells generate direct current (DC) power with the level of DC current being dependent on solar irradiation and the level of DC voltage dependent on temperature. When alternating current (AC) power is desired, an inverter is used to convert the DC energy into AC energy. Typical PV inverters employ two stages for power processing with the first stage configured for providing a constant DC voltage and the second stage configured for converting the constant DC voltage to AC current. Often, the first stage includes a boost converter, and the second stage includes a single-phase or three-phase inverter system.

Single and three phase photovoltaic inverters generally require a two-stage conversion power circuit to convert the varying DC voltage of a PV array to the fixed frequency constant amplitude AC voltage of the grid. Traditional PV inverters use a DC link as the intermediate energy storage step, which means that the converter first converts the variable PV array voltage to a constant DC voltage and subsequently converts the constant voltage into an AC current at the line frequency and unity power factor that can be injected into the grid.

PV systems/inverters can be designed to work with single or multiple arrays of PV cells. The power output of a PV system/inverter is greatly influenced by solar irradiation conditions associated with individual PV cells/arrays. Utilities often have other power resources, such as thermal power plants to balance their electrical loads, thus accommodating variability in PV power output during intermittent solar radiation conditions. Thermal power plants may include, for example, coal and gas fired stations. Power fluctuations of PV systems due to sudden cloud covering or others are usually dealt with by adjusting power output of these thermal power plants to provide relatively constant overall power matching demands. However, it is often difficult to change power output of thermal power plants quickly enough. Changing of power output may be also referred to as ramping. Thermal power generators desirably require a ramp rate that does not impose excessive thermal stresses, and that accommodate the natural lag times involved in heating and cooling the heat transfer components. As an example, coal-fired power stations may take over 12 hours to start from cold, and, even when hot, may take 2 to 3 hours to be ramped from 0-100% of their rated power. Ramping down of such thermal power generators may require even slower rates to minimize risk of damaging plant components. Solar conditions, on the other hand, may change drastically in a relatively shorter time span. It is, therefore, desirable to control power ramp rates of PV systems/inverters taking into consideration the maximum prescribed power ramp rates of such other power resources.

It is possible to limit power ramp rates of individual or multiple PV systems at any level up to a maximum power value that is dependent on the current solar conditions. This is achieved by curtailing a portion of the power output, so that the power ramp rate does not exceed a maximum desired ramp rate. However this limits the capture of solar energy and increases the effective cost of energy of the PV system(s). Further, although power ramp rate control has been achieved to some degree by such techniques on individual generators and wind farms, the problem has not been addressed at a photovoltaic system level.

There is, hence a need for a technique to control power ramp rates at a photovoltaic system/subsystem level within limits prescribed by transmission system operators, while allowing maximum capture of solar energy by individual PV arrays.

BRIEF DESCRIPTION

Briefly, in accordance with one embodiment of the invention, a solar photovoltaic (PV) control system comprises:
a PV system power sensing mechanism configured to monitor instantaneous collective output power generated via a plurality of PV subsystems and generate a sequence of instantaneous collective output power signals there from over a desired period of time; and
a rate controller, wherein the rate controller is configured to monitor a rate of change of collective power output generated via the plurality of PV subsystems in response to the sequence of instantaneous collective output power signals and control the rate of change of collective power output generated via the plurality of PV subsystems by generating a power output rate control signal based on the monitored rate of change of collective power output generated via the plurality of PV subsystems and a desired collective power change rate for the plurality of PV subsystems and communicating the power output rate control signal to the plurality of PV subsystems.

According to another embodiment of the invention, a solar photovoltaic (PV) system comprises:
a plurality of PV subsystems, each PV subsystem comprising:
at least one PV array; and
at least one PV inverter configured to generate AC power to a utility grid in response to available PV array power; and
a PV control system configured to generate a power output rate control signal based on a monitored rate of change of collective power output generated via the plurality of PV subsystems and a desired collective output power change rate for the plurality of PV subsystems and communicating the power output rate control signal to the plurality of PV subsystems to control a rate of change of one or more operating parameters of individual PV subsystems.

According to yet another embodiment of the invention, a solar photovoltaic (PV) system comprises:
at least one energy storage device;
a PV subsystem comprising:
a PV array; and
a PV inverter configured to generate at least one of single-phase and three-phase AC power to a utility grid in response to available PV array power; and
a PV control system configured to generate a power output rate control signal based on a monitored rate of change of power output generated via the PV subsystem and a desired output power change rate for the PV subsystem and communicating the power output rate control signal to the PV subsystem and the at least one energy storage device to control a rate of change of one or more operating parameters of the PV subsystem.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
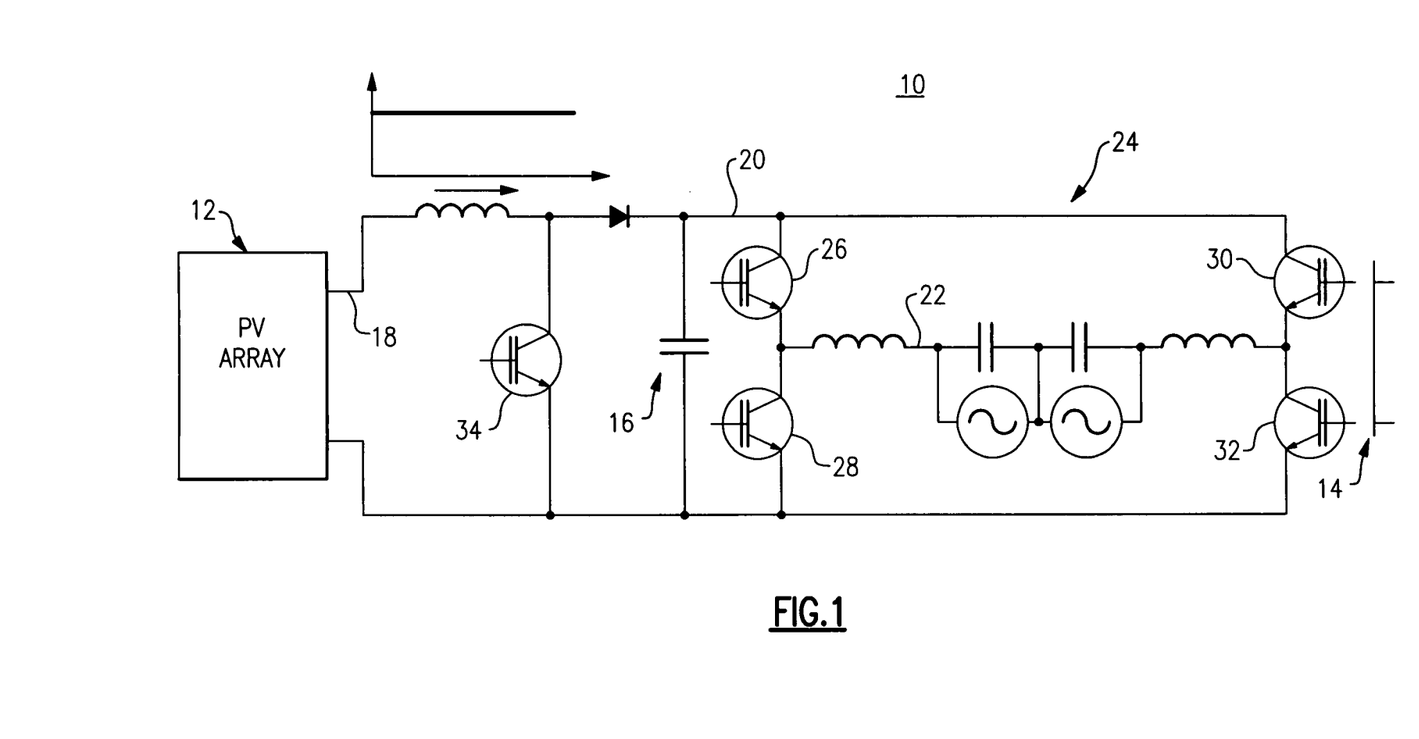
FIG. 1 is illustrates a PV inverter topology that is known in the art.

FIG. 1 is illustrates a photovoltaic inverter 10 topology that is known in the art. Photovoltaic inverter 10 employs a two-stage power circuit to convert a varying DC voltage of a PV array 12 to a fixed frequency AC current for a power grid 14. Photovoltaic inverter 10 uses a DC link capacitor 16 to implement the intermediate energy storage step. This means the PV inverter 10 first converts the variable PV DC voltage 18 to a constant DC voltage 20 that is greater than the grid voltage via a boost converter, and subsequently converts the constant DC voltage 20 to a current 22 via a PWM circuit 24 that can then be injected into the grid 14. Photovoltaic inverter 10 topology employs five switching devices 26, 28, 30, 32, 34 that are all switching at a high frequency.

A system and method for controlling collective power ramp rate of a PV system having a plurality of PV subsystems/inverters via a central or supervisory PV system controller are described below for particular embodiments of the invention. Other embodiments of the invention may include single or multiple PV arrays, and can implemented as single or multiple PV systems/inverters configured to generate single-phase or multi-phase power. In accordance with embodiments of the invention, the supervisory PV system controller is operable to control the ramp rate of the PV system within a maximum ramp rate set by transmission system operators. This rate generally applies to the average collective power ramp rate of the PV system over a time window of fixed duration, for example, 1 minute. In certain embodiments, a second (typically lower) ramp rate restriction may apply to the average collective power ramp rate of the PV system over a second time window of relatively longer duration, for example 10-15 minutes. These collective ramp rates may be applicable for various ranges of operation including start up, normal operation and shut down. Control of the collective power ramp rate is achieved by a ramp rate change limiting signal communicated by the supervisory PV system controller to individual PV subsystems/inverters. In one embodiment, the ramp rate change limiting signal includes a ramp rate command. In a different embodiment, the ramp rate change limiting signal may include a power set point command. Embodiments of the invention are described in more detail below referring generally to FIGS. 2-7.

Figure 2:
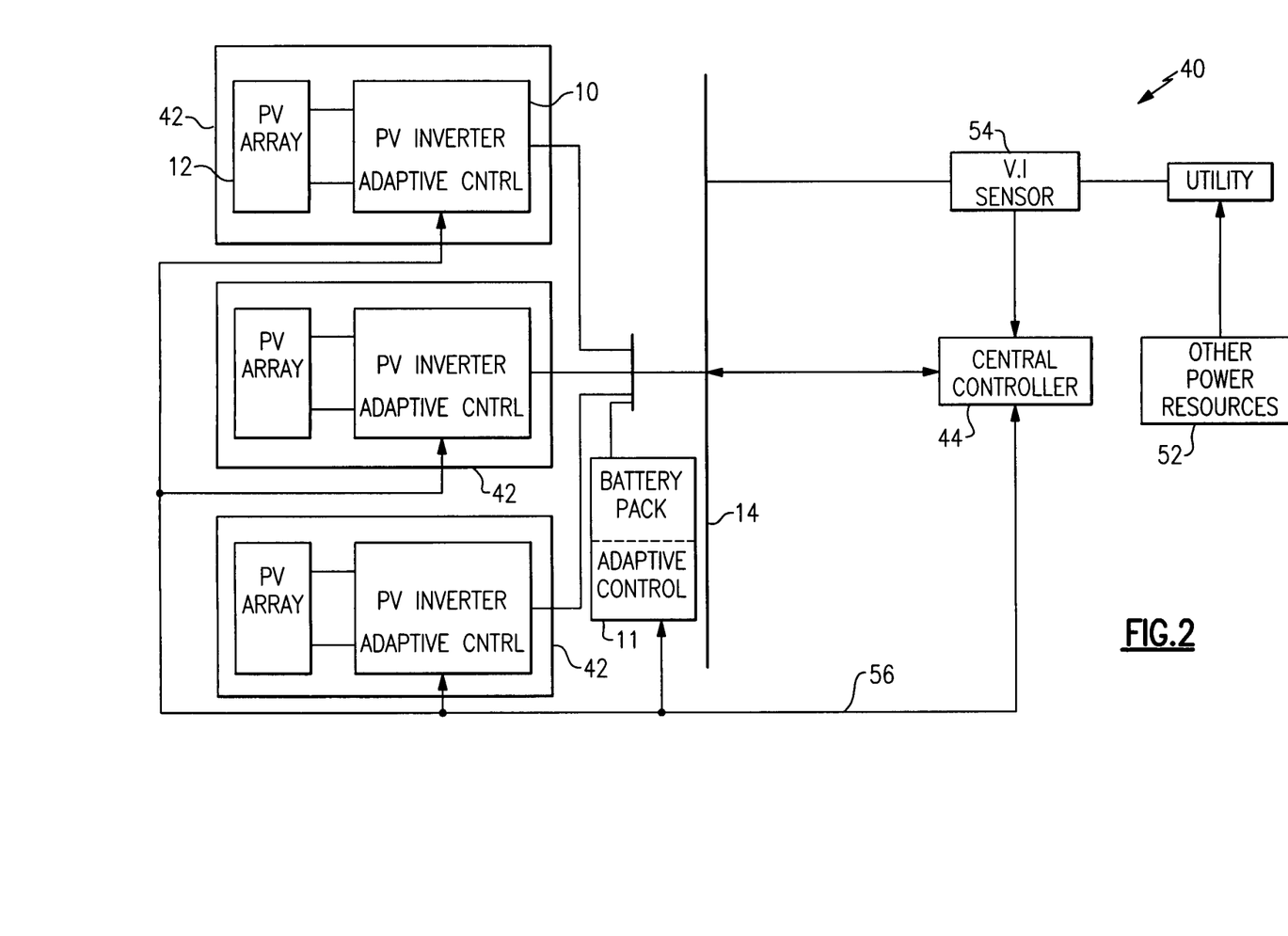
FIG. 2 is a schematic illustration of a PV control system according to one embodiment of the invention.

Looking now at FIG. 2, a PV control system 40 is illustrated in accordance with one embodiment of the invention. The PV control system 40 is configured to monitor and control a rate of change of collective power output of a plurality of PV subsystems 42, each subsystem having at least one PV array 12 and a PV inverter 10 operable to supply electrical power to a utility grid 14. Further, the utility grid 14 may receive power from other power resources 52 to accommodate variability in collective power output of the PV subsystems 42 due to changing solar conditions. These other power resources 52 may include, for example, thermal, hydroelectric or nuclear power stations, among others.

The PV control system 40 includes a PV system central controller 44. The central controller 44 is configured to monitor and control a rate of change of collective power output of the PV subsystems 42. Rate of change of collective power output is also referred to in this discussion as "collective power ramp rate." The PV system central controller 44 further comprises power sensors 54, such as voltage and current sensors, which are configured to sense collective power output of the PV subsystems 42.

The central controller 44 is configured to communicate with individual PV subsystems 42 via communication links 56 which may be implemented in hardware and/or software. In certain embodiments, the communication links 56 may be configured to remotely communicate data signals to and from the central controller 44 in accordance with any wired or wireless communication protocols known to one skilled in the wireless communication art. Such data signals may comprise, for example, signals indicative of operating conditions of individual PV subsystems 42 transmitted to the central controller 44 and various command signals communicated by the central controller 44 to individual PV subsystems 42. The central controller 44 may further be in communication with the utility grid 14, and may be operable to control various switching devices in the PV control system 40, such as capacitors and reactors (not shown) so as to control the collective power output of the PV subsystems 42 within specifications prescribed by the transmission system operators.

According to one embodiment, control of collective power ramp rate of the PV subsystems 42 is split into a power ramp rate limit control at the PV subsystem 42 level and a supervisory control at the PV control system 40 level. Each PV subsystem 42 may include, for example, an adaptive controller operable to implement a control algorithm configured to determine a power level command of its corresponding PV inverter 10. A power level command to the corresponding PV inverter 10 may be, for example, a function of inverter output current, and may be adapted to optimize PV subsystem performance at a given temperature and/or operating conditions. Control of power ramp rate limit at the PV subsystem 42 level is discussed in further detail below with reference to FIG. 3.

Figure 3:
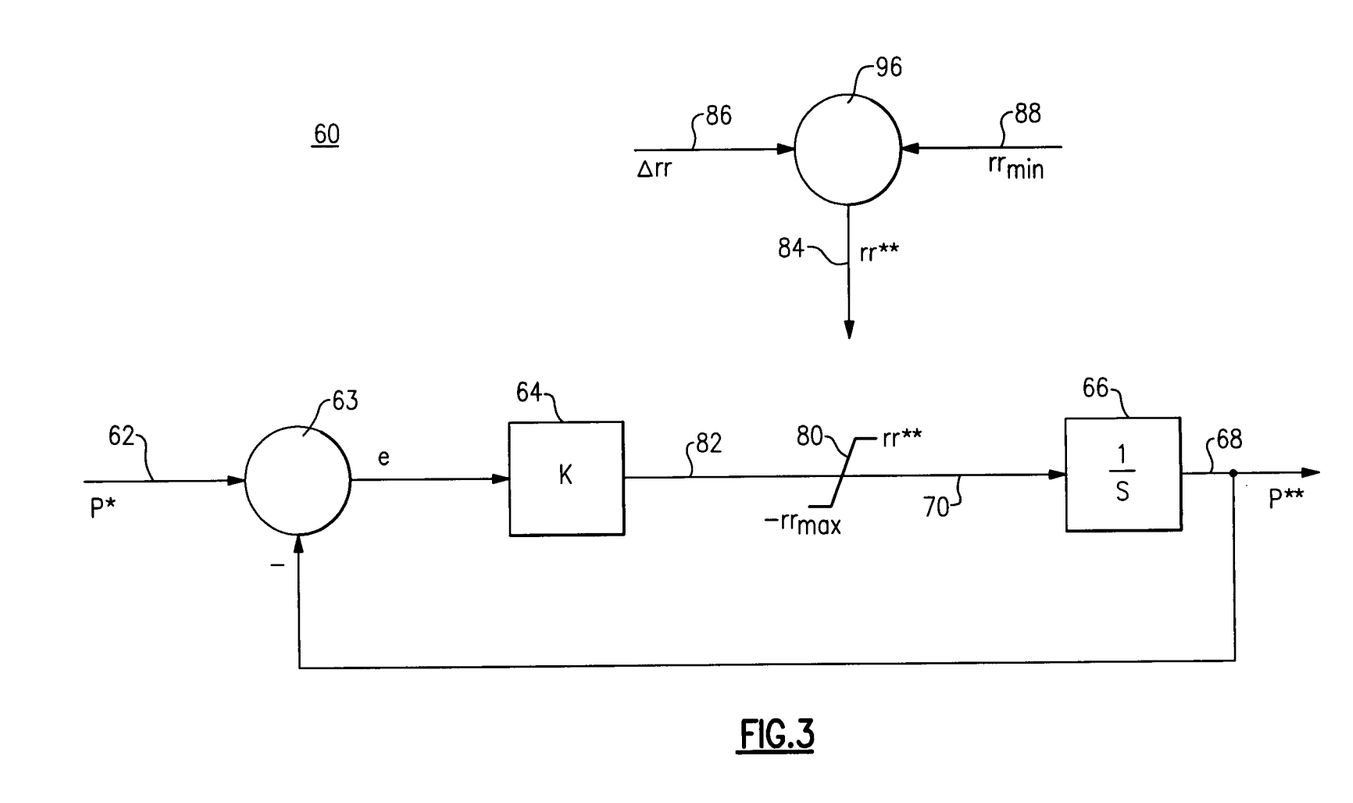
FIG. 3 is a schematic illustration of a PV inverter level ramp rate control mechanism in accordance with one embodiment of the invention.

FIG. 3 illustrates a PV subsystem power output level ramp rate control mechanism 60 in accordance with one embodiment of the invention. PV subsystem level control of output power ramp rate may be implemented in hardware and/or software via PV subsystem controllers such as the adaptive controllers discussed above for individual PV subsystems 42. According to one embodiment, the functional blocks of the PV subsystem control mechanism 60 are implemented after a power level command signal 62 is generated by the PV subsystem control mechanism 60 and before an actual power level command signal 68 is received by a PV subsystem inverter 10. As discussed below, the PV subsystem power output level control mechanism 60 is configured to limit the rate of change of the power level command signal, thereby controlling for example, rate of change of the PV subsystem inverter 10 output current.

The PV subsystem power output level ramp rate control mechanism 60 operates according to one embodiment, by limiting the rate of change of an actual power level command signal 68 received by the PV subsystem inverter 10, and employing a closed-loop feedback control system, such as an integral control system, to minimize an error (e) between the generated power level command signal 62 and the actual power level command signal 68 received by the PV subsystem inverter 10. As illustrated, the error (e) is obtained at a difference junction 63. The error (e) is amplified at block 64 by a known gain (K) before being integrated at block 66 with respect to time to yield a ramped signal 68, which is communicated to the PV subsystem inverter 10 as the actual power level command signal 68.

Input 70 to the integrator 66 is representative of the rate of change of the actual power level command signal 68 received by the PV subsystem inverter 10, and hence is also representative of the output power ramp rate of the PV subsystem inverter 10. According to one embodiment, the output power ramp rate of each PV subsystem inverter 10 is controlled by limiting the input to its corresponding adaptive controller integrator 66 via a rate-limiter 80. The rate-limiter 80 is configured such that output 70 of the rate-limiter 80 is limited by a maximum value defined by an upper bound of the rate-limiter 80. That is, the output 70 of the rate-limiter 80 is equal to the input 82 to the rate limiter 80 until the input 82 exceeds the upper bound, in which case the output 70 of the rate-limiter is substantially constant and equal to the upper bound value. In one embodiment, the upper bound of the rate-limiter 80 is defined by a rate limiting signal (84) based on a ramp rate command signal (86) generated by the PV central controller 44 explained in further detail below. The ramp rate command signal (86) is based on desired long-term and short-term collective output power ramp rates of the PV subsystems 42 set by transmission system operators. It is thus possible to control maximum output power ramp rates of individual PV subsystems 42 by adjusting the ramp rate command signal (86) by the PV controller 44. By setting the upper-bound of the limiter 80 via the rate limiting signal (84), the rate of change of power output of each PV subsystem 42 may be controlled in a way such that rate of change of PV subsystem power output does not exceed ramp rate limits set by the PV controller 44. In certain embodiments, the rate-limiter 80 may also include a lower bound 88, indicative of a maximum specified negative power ramp rate of each PV subsystem 42.

The feedback control system 60 according to one embodiment, is adapted to minimize the error (e) with time, such that the actual power level command 68 approaches the generated power level command 62. At steady state, the error (e) approaches zero, resulting in a substantially constant output power level command signal 68 received by the PV subsystems 42. The rate at which the error (e) approaches zero is dependent on the value of the gain K. Hence, the gain K is chosen to have a sufficiently large value to provide a desirably fast closed-loop response to variations in the output power command signal. According to one embodiment, subsystem level control of output power ramp rate may be achieved via limiting of a power command by the rate limiting signal.

Output current set points are then calculated based on output power level settings and applied to the respective PV subsystems 42.

Figure 4:
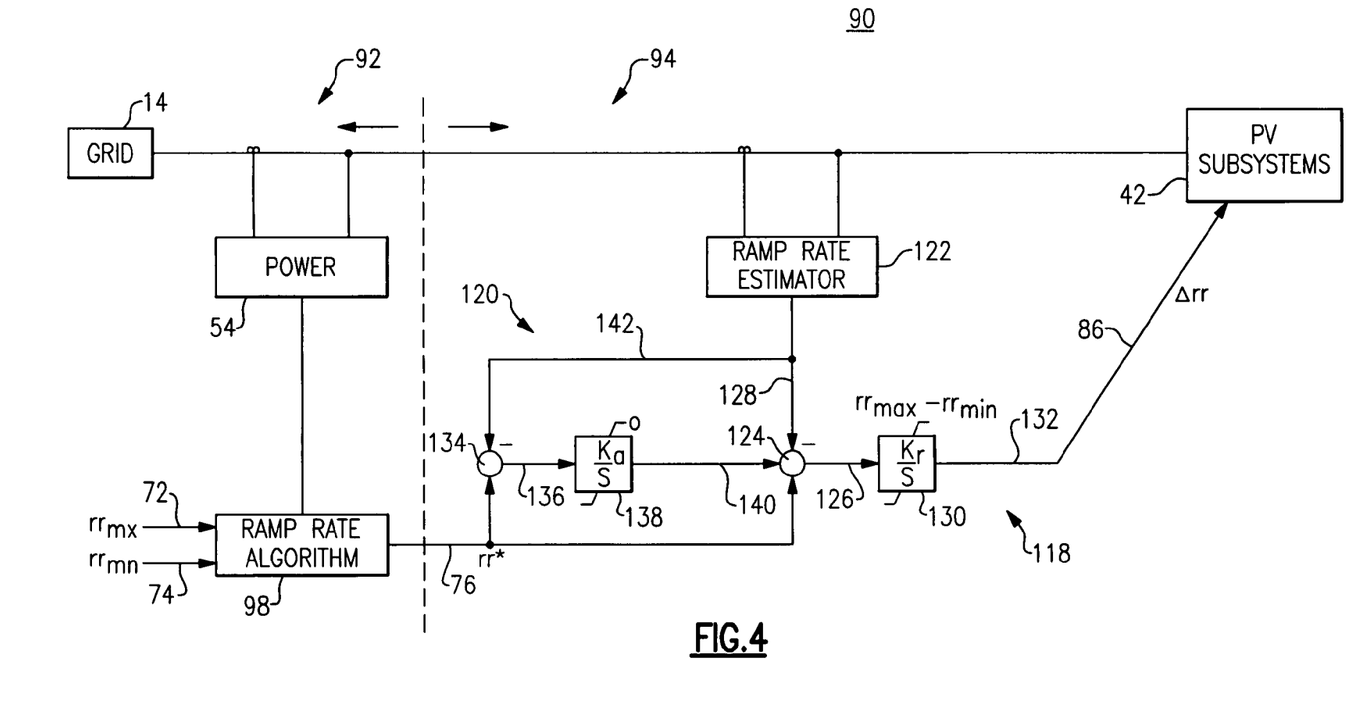
FIG. 4 is a schematic illustration of a supervisory ramp rate control mechanism in accordance with one embodiment of the invention.

According to one embodiment, the PV controller 44 is configured to control a rate of change of collective power output of the PV subsystems 42 at a PV central control system power level via a supervisory ramp rate control mechanism 90 illustrated in FIG. 4. Functional blocks of the supervisory ramp rate control mechanism 90 are implemented via the central controller 44. The supervisory ramp rate control mechanism 90 includes a slow-ramp rate control mechanism 92 and a fast-ramp rate control mechanism 94. The slow-ramp rate control mechanism 92 is operable to generate a power output ramp rate request signal 76 which is provided to maximize collective energy production of the PV subsystems 42 while maintaining average output power ramp rate of the PV subsystems 42 within limits specified by transmission system operators. The fast-ramp rate control mechanism 94 operates by comparing a measured collective PV subsystem output power ramp rate against the output power ramp rate request signal 76 and adjusting output power ramp rates at individual PV subsystem levels to maintain the requested level. The slow ramp control mechanism 92 and the fast ramp control mechanism 94 are described in greater detail below.

The slow-ramp control mechanism 92 comprises a ramp rate algorithm 98 configured to monitor collective subsystem power output sensed by power sensors 54 and compute an output power ramp rate request 76 based on a first specified average output power ramp rate 72 for a first time window and a second specified average output power ramp rate 74 for a second time window. In one embodiment, the first and second time windows have durations of about 1 minute and 10-15 minutes respectively. The first specified average output power ramp rate 72 is typically greater than the second specified average output power ramp rate 74. Hence, the first and second specified average output power ramp rates are also referred to in this discussion as fast ramp rate and slow ramp rate respectively. The fast ramp rate 72 and the slow ramp rate 74 are generally specified by the transmission system operators.

The fast-ramp output power control mechanism 94 is operable to communicate the ramp rate request 76 thus established to individual PV subsystems 42 as a ramp rate command signal (rr) 86. This is achieved via a feedback control loop 118 and a corrector loop 120. The feedback control loop 118 is configured to provide a closed-loop response for reducing errors between the ramp rate request 76 and the actual output power ramp rate of the collective PV subsystems. Actual output power ramp rate 142 of the collective PV subsystems 42 is established by a ramp rate estimation module 122. In one embodiment, ramp rate estimation module 122 may comprise an algorithm adapted to determine a rolling average of rate of change of sensed collective PV subsystem power output. At junction 124, a signal 126 is generated based on a difference between the ramp rate request 62 and the actual collective PV subsystem ramp rate 142 estimated at block 122. Closed-loop response is achieved via an integral controller 130, which amplifies the signal 126 by a known gain (Kr) and integrates the resulting signal with respect to time. The gain (Kr) is adjusted to provide an adequately fast closed-loop response to ramp rate disturbances in the collective PV subsystems 42.

The maximum and minimum instantaneous ramp rates set by a PV subsystem 42 are identified in FIGS. 3 and 4 as $rr_{max}$ and $rr_{min}$ respectively. In general, $rr_{max} \geq rr_{mx} \geq rr_{mn} \geq rr_{min}$. According to one embodiment, output signal 132 of the integral controller 130 is limited by an upper bound value equal to a difference between these maximum and minimum values, as illustrated in FIG. 4. This output signal 132 is then broadcast to the collective PV subsystems 42 as an output power ramp rate command signal (rr) 86. In one embodiment, the ramp rate command signal (rr) 86 is communicated by the central controller 44 to individual PV subsystems 42 via communication links 56 shown in FIG. 2, which may comprise wired or wireless remote communication links as described above.

As shown in FIG. 3, the ramp rate command signal (rr) 86 is summed with the minimum specified ramp rate ($rr_{min}$) 88 at junction 96 to yield a ramp rate limiting signal (rr) 84 for individual PV subsystem 42 adaptive controllers. The ramp rate limiting signal (rr) 84 is thus designed to be greater than or equal to a minimum value defined by ($rr_{min}$) 88. Hence, when the ramp rate command (rr) 86 approaches zero, maximum output power ramp rate attainable by the corresponding PV subsystem 42 is equal to the minimum instantaneous output power ramp rate ($rr_{min}$) 88 of the collective PV subsystems. In accordance with aspects of the present technique, during normal operation when rr>0, certain PV subsystems 42 may ramp their power output at a rate greater than the minimum specified rate ($rr_{min}$) 88, while certain other PV subsystems 42 operate at relatively slower (or negative) ramp rates dictated by local solar conditions for these PV subsystems, such that average output power ramp rate of the collective PV subsystems does not exceed the fast or slow average ramp rates set by the transmission system operator. The above feature allows maximum capture of solar energy by the individual PV subsystems 42 while maintaining the output power ramp rates specified by the transmission system operator at the PV control system level. This is particularly advantageous in large PV systems, where solar conditions vary significantly among individual PV subsystems 42.

When the actual collective PV subsystem power ramp rate 142 exceeds the ramp rate request 76, the output 126 obtained at the junction 124 becomes negative. The closed-loop control mechanism 118 accordingly reduces the ramp rate request (rr*) 76, such that the collective PV subsystem power output 142 approaches the ramp rate (rr*) 76. However, in such a case, the collective PV subsystem ramp rate averaged over the smaller time window of one minute tends to be greater than the fast ramp rate ($rr_{mx}$) 72 prescribed by the transmission system operators. The corrector loop 120 is operable to adjust the ramp rate request (rr*) 76 to provide a correction for the average collective PV subsystem output power ramp rate over a one minute time window. In one embodiment, at junction 134, a signal 136 is generated based on the difference between the ramp rate request (rr*) 76 and the actual collective PV subsystem rate 142. The signal 136 is amplified by a gain (Ka) and integrated via an integral controller 138. The integral controller 138 is configured to generate an output 140 only if the signal 136 comprises a negative value. This may be achieved by setting the upper bound value for the integral controller 138 to zero. Thus, when the actual collective PV subsystem output power ramp rate 142 exceeds the ramp rate request (rr*) 76, the signal 140, which comprises a negative value, is summed with the difference between the ramp rate request (rr*) 76 and the actual wind farm power output 142 at the junction 124. This causes the input 126 to the feedback control mechanism 118 to have an additional negative component, which tends to further decrease the actual collective PV subsystem power output 142 below the ramp rate request (rr*) 76, such that when averaged over a one minute time duration, the average collective PV subsystem ramp rate follows the specified fast ramp rate over a 1 minute time window. The operation of the corrector loop 120 is further illustrated with reference to FIG. 5.

Figure 5:
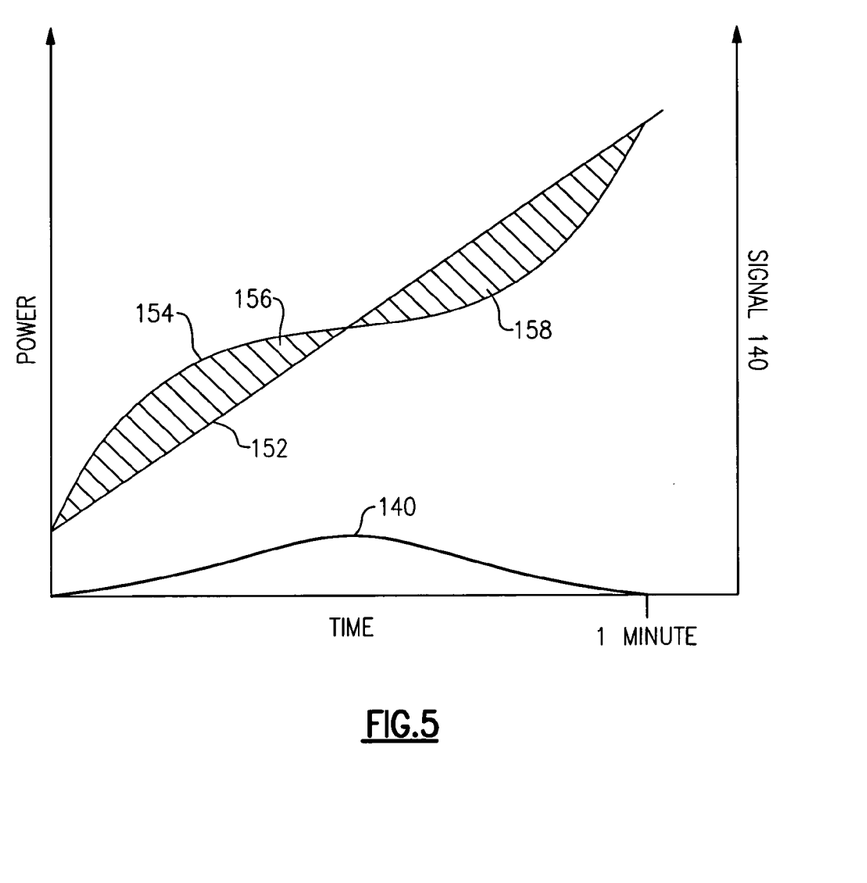
FIG. 5 is a graphical illustration showing the variation with time of ramp rate request and actual collective PV subsystem ramp rate with time according to aspects of the invention.

FIG. 5 illustrates an exemplary variation in the ramp rate request and the actual collective PV subsystem output power ramp rate with time according to aspects of the present technique. The desired output power ramp rate (corresponding to rr* 76) is generally represented by trace 152 and the corresponding variation in actual collective PV subsystem power output is represented generally by trace 154. As illustrated, when the actual collective PV subsystem output power ramp rate increases above the ramp rate request (represented by a positive area 156), the corrector loop 120 adjusts the collective PV subsystem ramp rate via a correction signal 140 causing actual power output to fall below the ramp rate request (represented by a negative area 158), such that the arithmetic sum of areas 156 and 158 over a one minute time duration is zero. The corrector loop 120 is thus configured to regulate the collective PV subsystem power ramp rate to obey the fast ramp rate over the one-minute window.

Figure 6:
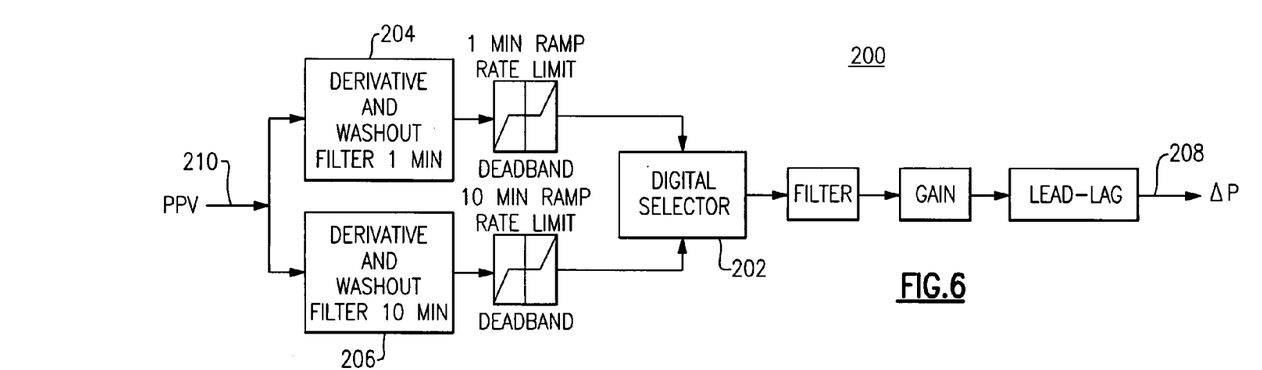
FIG. 6 is a schematic illustration of a supervisory ramp rate control mechanism in accordance with another embodiment of the invention.

FIG. 6 is a schematic illustration of a supervisory ramp rate control mechanism 200 in accordance with another embodiment of the invention. Supervisory ramp rate control mechanism 200 includes a digital selector 202 that functions to determine whether a one minute ramp rate limit 204 or a ten minute ramp rate limit 206 will be used to control the ramp rate of each PV inverter 10. In one embodiment, a ramp rate command signal (P) 208 is communicated by the central controller 44 to individual PV subsystems 42 via communication links 56 shown in FIG. 2, which may comprise wired or wireless remote communication links such as described above.

The rate-limiters 202, 204 are configured such that the outputs are limited by a maximum value defined by an upper bound. The outputs of each rate-limiter 204, 206 will be equal to its corresponding input until the input exceeds the upper bound, in which case the output of the rate-limiter is substantially constant and equal to the upper bound value. In one embodiment, the upper bound of each rate-limiter 204, 206 is defined by an operator specified rate limiting signal 210. It is thus possible to control maximum output power ramp rates of individual PV subsystems by adjusting the ramp rate command signal by the PV controller 44. By setting the upper-bound of the limiters 204, 206 via a rate limiting signal 208, the rate of change of power output of each PV subsystem 42 may be controlled in a way such that rate of change of PV subsystem power output does not exceed ramp rate limits set by the PV controller 44.

In certain embodiments, the rate-limiters 204, 206 may also include a lower bound, indicative of a maximum specified negative power ramp rate of each PV subsystem 42. If for example, one or more inactive PV subsystems 42 suddenly become active due to a change in shading conditions, more PV subsystems will then become available to supply power to the grid 14. When this condition occurs, the PV subsystems 42 providing power to the grid 14 prior to the change in shading conditions will have to reduce their output power in similar fashion via a negative slope ramp in response to the specified negative power ramp rate in order to accommodate the additional power provided by the newly active PV subsystems.

An exemplary scenario would be where only part of the PV systems 42 are in operation while the power ramp rate is controlled, and the units originally not in operation become active. The controller in this situation should mandate the already active units to reduce their power command at a predetermined rate, while at the same time increasing the power commands issued to the units commencing operation. The resulting ramp for the total power command should in this manner remain at or below the desired rate of change.

According to one embodiment, energy storage devices, including without limitation, a battery bank 11, such as depicted in FIG. 2, can provide the necessary additional power to accommodate a ramp down of PV subsystem 42 power during shady conditions when no more than one PV subsystem 42 is available to provide power to the grid 14.

Figure 7:
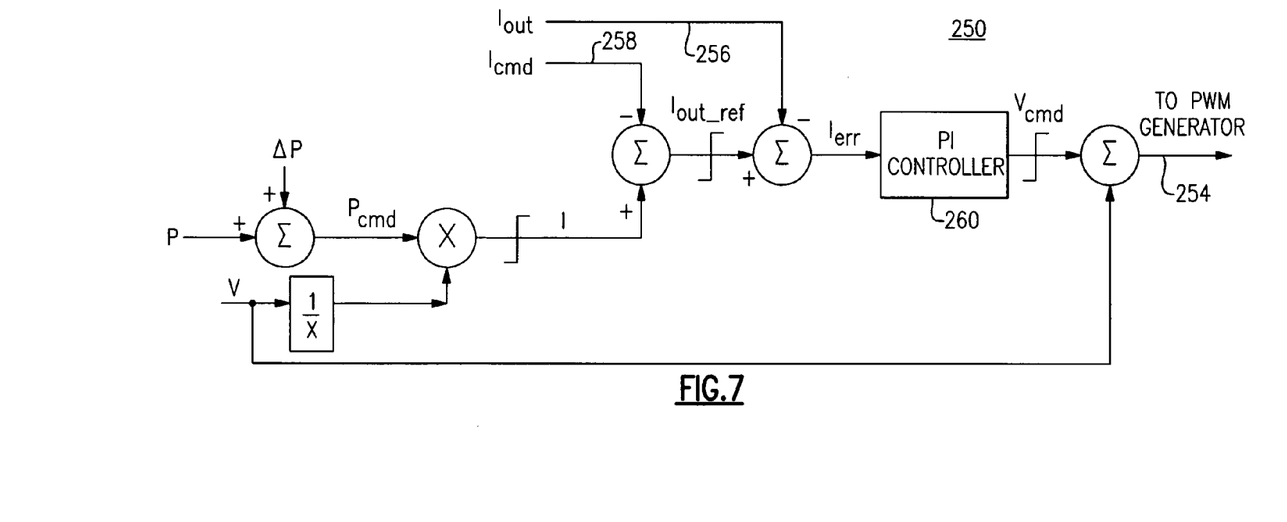
FIG. 7 is a schematic illustration of a PV inverter level ramp rate control mechanism in accordance with another embodiment of the invention.

FIG. 7 is a schematic illustration of a PV subsystem inverter power level ramp rate control mechanism 250 in accordance with another embodiment of the invention. According to one embodiment, the functional blocks of the PV subsystem inverter power level ramp rate control mechanism 250 are implemented after a power level command signal 252 is generated by the PV subsystem inverter power level ramp rate control mechanism 250 in response to the rate limiting signal 208 generated by the central controller 44 and before an actual power level command signal 254 is received by a PV subsystem inverter 10. As discussed further below, the PV subsystem inverter power level ramp rate control mechanism 250 is configured to limit the rate of change of the power level command signal 254, thereby controlling for example, rate of change of the PV subsystem inverter 10 output current.

The PV subsystem inverter power level ramp rate control mechanism 250 operates according to one embodiment, by limiting the rate of change of an actual power level command signal 254 received by a PV subsystem inverter 10, and employing a closed-loop feedback control system to minimize an error (e) between the generated PV subsystem current 256 and the actual grid current 258. A corresponding error (e) signal is processed via a PI controller 260 to yield the power level command signal 254 which is communicated to the PV subsystem inverter 10.

The above described techniques provide a coordinated control of PV system output power ramp rates that manages aggregate behavior of the PV subsystems with respect to short-term and long-term ramp rates specified by transmission system operators. The features described further provide for maximum capture of solar energy by the PV system by allowing individual PV subsystems to operate above or below the desired collective ramp rate for the PV system.

The principles described above can be employed equally well to accommodate single-phase or multi-phase distribution system embodiments. Further, the ramp rate control features can be configured, without limitation, to dynamically increase solar PV system power in response to utility power grid frequency deviations, harmonics injected into a utility power grid via a corresponding PV subsystem, a utility power grid balancing requirement associated with different PV subsystems in different phases, a utility power grid voltage variation compensation requirement, or a utility power grid stabilization requirement.

As will be appreciated, the above described techniques may take the form of computer or controller implemented processes and apparatuses for practicing those processes. Aspects of the present technique may also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The techniques described may further be embodied in the form of computer program code or signal, for example, whether stored in a storage medium, loaded into and/or executed by a computer or controller or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A solar photovoltaic (PV) control system comprising:
   a plurality of PV subsystems connected together in parallel;
   a PV system power sensing mechanism configured to monitor instantaneous collective output active power generated via the plurality of PV subsystems connected together in parallel and generate a sequence of instantaneous collective output active power signals there from over a desired period of time; and
   a rate controller, wherein the rate controller is programmed to monitor a rate of change of collective active power output generated via the plurality of PV subsystems in response to the sequence of instantaneous collective output active power signals and control the rate of change of collective active power output generated via the plurality of PV subsystems by generating an active power output rate control signal based on the monitored rate of change of collective active power output generated via the plurality of PV subsystems and a desired collective active power change rate for the plurality of PV subsystems and communicating the active power output rate control signal to the plurality of PV subsystems;
   wherein each PV subsystem comprises a corresponding power output level ramp rate control mechanism programmed to control its power output level ramp rate independent from every other PV subsystem power output level ramp rate in response to the active power output rate control signal, and further to prevent its power output rate of change from exceeding ramp rate limits set by the rate controller while maintaining the desired collective active power change rate for the plurality of PV subsystems.

2. The solar PV control system according to claim 1, wherein each PV subsystem comprises:
   at least one PV array; and
   a PV inverter configured to generate at least one of single-phase or multi-phase AC active power to a utility grid in response to available PV array active power.

3. The solar PV control system according to claim 2, wherein at least one PV subsystem is configured to vary an inverter output current in response to the active power output rate control signal.

4. The solar PV control system according to claim 1, wherein each PV subsystem comprises:
   at least one PV array; and
   a DC to multiple-phase AC inverter configured to generate multi-phase AC active power to a utility grid in response to available PV array active power.

5. The solar PV control system according to claim 1, wherein the active power output rate control signal is further based on a collective PV subsystem output active power ramp rate during a first time period and a collective PV subsystem output active power ramp rate during a second time period greater than the first time period.

6. The solar PV control system according to claim 1, wherein the rate controller is further programmed to mandate active PV subsystems to reduce their active power at a first predetermined rate, while at the same time mandating PV subsystems commencing operation to increase their active power at second predetermined rate such that the resulting rate of change for the collective PV subsystem active power remains at or below the ramp rate limits set by the rate controller.

7. The solar PV control system according to claim 1, wherein the desired collective active power change rate for the plurality of PV subsystems corresponds to a positive ramp rate.

8. The solar PV control system according to claim 1, wherein the desired collective active power change rate for the plurality of PV subsystems corresponds to a negative ramp rate.

9. The solar PV control system according to claim 1, wherein the active power output rate control signal is further based on at least one of a utility power grid frequency deviation, harmonics injected into a utility power grid via a corresponding PV subsystem, a utility power grid balancing requirement associated with different PV subsystems in different phases, a utility power grid voltage compensation requirement, or a utility power grid stabilization requirement.

10. The solar PV control system according to claim 1, wherein the PV system active power sensing mechanism is further configured to monitor instantaneous output active power generated via at least one energy storage device to generate the sequence of instantaneous collective output power signals.

11. The solar PV control system according to claim 10, wherein the rate controller is further configured to monitor a rate of change of collective active power output generated via the plurality of PV subsystems and the at least one energy storage device in response to the sequence of instantaneous collective output active power signals and control the rate of change of collective active power output generated via the plurality of PV subsystems and the at least one energy storage device.

12. A solar photovoltaic (PV) system comprising:
a plurality of PV subsystems connected together in parallel, each PV subsystem comprising:
at least one PV array; and
at least one PV inverter configured to generate at least one of single-phase or multi-phase AC active power in response to available PV array active power; and
a PV control system programmed to generate an active power output rate control signal based on a monitored rate of change of collective active power output generated via the plurality of PV subsystems and a desired collective output active power change rate for the plurality of PV subsystems and communicating the active power output rate control signal to the plurality of PV subsystems to control a rate of change of one or more operating parameters of individual PV subsystems, wherein each PV subsystem further comprises a corresponding power output level ramp rate control mechanism programmed to control its power output level ramp rate independent from every other PV subsystem power output level ramp rate in response to the active power output rate control signal, and further to prevent its power output rate of change from exceeding ramp rate limits set by the rate controller while maintaining the desired collective active power change rate for the plurality of PV subsystems.

13. The solar PV system according to claim 12, wherein the operating parameters comprise at least PV inverter output current.

14. The solar PV system according to claim 12, wherein the active power output rate control signal is further based on a collective PV subsystem output active power ramp rate during a first time period and a collective PV subsystem output active power ramp rate during a second time period greater than the first time period.

15. The solar PV control system according to claim 12, wherein the desired collective output active power change rate for the plurality of PV subsystems corresponds to a positive ramp rate.

16. The solar PV control system according to claim 12, wherein the desired collective output active power change rate for the plurality of PV subsystems corresponds to a negative ramp rate.

17. The solar PV control system according to claim 12, wherein the active power output rate control signal is further based on at least one of a utility power grid frequency deviation, harmonics injected into a utility power grid via a corresponding PV subsystem, a utility power grid balancing requirement associated with different PV subsystems in different phases, a utility power grid voltage variation compensation requirement, or a utility power grid stabilization requirement.

18. A solar photovoltaic (PV) system comprising:
at least one energy storage device;
a plurality of PV subsystems connected together in parallel, each PV subsystem comprising:
a PV array; and
a PV inverter configured to generate at least one of single-phase or multi-phase AC active power in response to available PV array active power; and
a PV control system programmed to generate an active power output rate control signal based on a monitored collective rate of change of active power output generated via the plurality of PV subsystems and a desired collective output active power change rate for the plurality of PV subsystems and communicating the active power output rate control signal to the plurality of PV subsystems and the at least one energy storage device to control a rate of change of one or more operating parameters of the plurality of PV subsystems, wherein each PV subsystem further comprises a corresponding power output level ramp rate control mechanism configured programmed to control its power output level ramp rate independent from every other PV subsystem power output level ramp rate in response to the active power output rate control signal, and further to prevent its power output rate of change from exceeding ramp rate limits set by the rate controller while maintaining the desired collective active power change rate for the plurality of PV subsystems.

19. The solar PV system according to claim 18, wherein the one or more operating parameters comprise at least PV inverter output current.

20. The solar PV system according to claim 18, wherein the active power output rate control signal is further based on a PV subsystem output active power ramp rate during a first time period and a PV subsystem output active power ramp rate during a second time period greater than the first time period.

21. The solar PV control system according to claim 18, wherein the desired output active power change rate for the PV subsystem corresponds to a positive ramp rate.

22. The solar PV control system according to claim 18, wherein the desired output active power change rate for the PV subsystem corresponds to a negative ramp rate.

23. The solar PV control system according to claim 18, wherein the active power output rate control signal is further based on at least one of a utility power grid frequency deviation, harmonics injected into a utility power grid via a corresponding PV subsystem, a utility power grid balancing requirement associated with different PV subsystems in different phases, or a utility power grid stabilization requirement.

* * * * *

UNITED STATES PATENT AND TRADEMARK OFFICE
CERTIFICATE OF CORRECTION

PATENT NO. : 8,901,411 B2  
APPLICATION NO. : 12/229893  
DATED : December 2, 2014  
INVENTOR(S) : Liu et al.

Page 1 of 1

It is certified that error appears in the above-identified patent and that said Letters Patent is hereby corrected as shown below:

In the Specification

In Column 3, Line 4, delete "FIG. 1 is" and insert -- FIG. 1 --, therefor.

In the Claims

In Column 12, Line 13, in Claim 15, delete "control system" and insert -- system --, therefor.

In Column 12, Line 18, in Claim 16, delete "control system" and insert -- system --, therefor.

In Column 12, Line 22, in Claim 17, delete "control system" and insert -- system --, therefor.

In Column 12, Line 50, in Claim 18, delete "mechanism configured" and
insert -- mechanism --, therefor.

In Column 13, Line 1, in Claim 21, delete "control system" and insert -- system --, therefor.

In Column 13, Line 4, in Claim 22, delete "control system" and insert -- system --, therefor.

In Column 13, Line 7, in Claim 23, delete "control system" and insert -- system --, therefor.

Signed and Sealed this
Thirty-first Day of March, 2015

Michelle K. Lee
*Director of the United States Patent and Trademark Office*